Patented Nov. 7, 1950

2,529,108

UNITED STATES PATENT OFFICE 2,529,108

POLYMERIC ACRYLATE ESTER COMPOSITIONS

Carl L. Shapiro, Beaver Falls, Pa., assignor to Acryvin Corporation of America, Astoria, N. Y., a corporation of Delaware No Drawing. Application February 3, 1945, Serial No. 576,161

6 Claims. (Cl. 260—89.5)

The present invention is directed to the treatment of acrylic and methacrylic compounds especially the acid esters thereof. More particularly the invention is concerned with the production of thermoplastic substances of resinous nature.

Resins of the acrylic and methacrylic type have been in use for some years and found considerable application in sheetings, castings, moldings, etc., where lightness, clarity, toughness, and corrosion resistance are essential. However, their uses are somewhat limited because of their lack of hardness and abrasion resistance, and their low softening temperatures. As a result, extensive investigations are under way to harden these resins and raise their softening temperatures. This has been accomplished to various degrees but to date the results have not been fully satisfactory.

The present invention is intended and adapted to overcome the above mentioned inherent disadvantages such as lack of hardness, low abrasion resistance, and low softening temperatures. As a consequence of this invention, countless new applications have been opened where resistance to abrasion and boiling water is essential. A few typical new applications are: washing machine agitators, washing machine covers, refrigerator parts especially for exterior surfaces, sterilization units, kitchen and eating utensils such as knives, forks, spoons, plates, etc., where washing in hot water is essential for cleansing, medical, surgical and dental instruments which require sterilization, plane and cock-pit parts where hardness, abrasion resistance, and high temperature resistance is essential, hospital, industrial, bathroom accessories, etc., where resistance to abrasion and temperature is necessary, dentures, castings, sheeting, coating compositions, etc., electrical accessories and equipment, optics, optical equipment, lenses etc. Although the above mentioned are a few of the many applications, the present invention is not confined to them but extends to all possible applications.

In view of the above, it is among the objects of the present invention to provide an acrylate resinous composition which is adapted to be heat treated in order to harden the same.

It is also among the objects of the present invention to modify acrylate resins and the substances from which such resins are made by the addition thereto of substances which will improve the character of the resulting resins.

In carrying the objects of the invention into effect, I provide either a simple acrylic ester or a polymer thereof and add thereto a small proportion of an organic acid. Specifically, the organic acid is one which has from three to ten carbon atoms and contains at least one carboxy group. The acids are either polycarboxy or hydroxy carboxy acids.

The present invention includes adding salicylic acid to acrylic or methacrylic acid esters or compounds and combinations of these with other resins and solvents that react with them. The amount of salicylic acid may vary from 0.0001 per cent to 20.0 per cent by weight. However, for most practical purposes, the amount of salicylic acid does not exceed 5.0 per cent but in some applications the higher percentages are essential to obtain the desired physical properties. While the material cannot be fully hardened by the present conventional methods of making the polymer inasmuch as the polymerization temperature is rather low (50° to 80° C.) in order to prevent bubbling in sheets, castings, etc., and also to have a low average molecular weight material which can either be readily molded or easily soluble in solvents, the salicylic treated material may be subsequently hardened by heating above 80° C. and up to 120° C. by any of the conventional methods. For normal purposes, boiling water is most convenient since the final hardness, abrasion resistance and softening temperature is a time-temperature function which is controlled by composition. The additional hardening converts the material from a low temperature thermoplastic substance to a hard abrasion resistant thermoplastic material which can be described almost as a thermosetting material since it does not soften at temperatures where regular compositions of acrylate or methacrylic substances become extremely plastic and easily formed into any desired shape.

The following are specific examples of the practical application of salicylic acid in the making of the improved acrylate resins.

Example I

Methyl methacrylate monomer containing 0.1 per cent benzoyl peroxide and 0.05 per cent salicylic acid is slowly refluxed and then added to an aqueous solution containing a detergent and polymerized into a fine powder or grains with heat and constant stirring. After the resultant powder or grainy material is precipitated, washed and dried, it may be used for molding, coatings, sheeting, casting, etc. The finished article may or may not be subsequently hardened by heating to obtain full hardening properties. Incorporated in the above monomeric material may be the conventional amounts of plasticizers which are regularly used in this type of resin, although in some applications they are not essential. In some applications it is desirable to add dyes and pigments to the above material prior to polymerization. However, the material may also be dyed after the finished article is made.

*Example II*

Methyl methacrylate monomer containing 0.2 per cent benzoyl peroxide and 5.0 per cent salicylic acid is slowly refluxed until the desired consistency is obtained and then added to an aqueous solution which contains one or more detergents, such as sulphonated oils, alcohols, etc., and the material is polymerized into a powder or grains with heat and constant stirring. After washing and drying, the material may be used for molding, coating, sheeting, castings, etc. Incorporated in the above monomeric material may be the conventional amounts of plasticizers. The finished article may or may not be subsequently hardened by heating.

*Example III*

In place of the methyl methacrylate monomer in Examples I and II respectively, any other monomer or compound of the methacrylate or acrylate series may be substituted. They may be any of the ethyl, propyl, butyl, isobutyl and higher alkyl or aryl compounds up to twelve carbon atoms or combinations of them. Other inter-polymers may also be used.

*Example IV*

A solution of methyl acrylate monomer containing 0.005 per cent benzoyl peroxide and 1.0 per cent salicylic acid is refluxed until the desired consistency is obtained and then cast into molds or poured into containers to form sheets. The material may be hardened by being further polymerized at room temperature or elevated temperatures to its solid condition. It may subsequently be further hardened by heating in boiling water, steam, or in an oven. The increased hardness is a composition-time-temperature function.

*Example V*

A solution of pure methacrylate monomer containing 0.05 per cent salicylic acid is slowly mixed with a dry powder of methacrylate polymer and the resultant mixture permitted to set in a closed container until the polymer grains dissolve or absorb the treated methacrylate monomer and results in a hard or rubbery mass, solid gum, gell, or liquid, depending upon the ratio of treated monomer to polymer. The ratio of salicylic acid treated monomer to polymer may vary from 1:10 to 100:1 depending upon whether a solid grainy mass, solid gum-like or liquidy consistency is desired. The material may be further polymerized or used directly for molding, sheeting, castings, coating, etc., depending upon ratio of treated monomer to polymer. The rate of polymerization may be increased by the addition of any organic catalysts such as benzoyl peroxide or inorganic catalysts such as vanadium oxides, titanium oxides, etc.

Incorporated in the above material may be one or more plasticizers such as dibutyl phthalate, triacetin, etc. which do not interfere with the desired chemical and physical properties. In addition, various dyes or pigments may or may not be used in the above mixtures with or without plasticizers.

The finished product may be subsequently hardened in boiling water or at temperatures higher or lower than boiling water, inasmuch as the final hardening is a time-temperature function and is controlled by composition. The final product is then resistant to boiling water.

*Example VI*

A solution of pure methacrylate monomer containing 0.2 per cent salicylic acid and 0.005 per cent benzoyl peroxide is slowly mixed with the dry powder of methacrylate polymer. The resultant mass is slowly refluxed with or without constant stirring until the desired viscosity is obtained. The viscous material may then be rapidly cooled to room temperature to prevent further polymerization or partially cooled and then slowly cooled to increase the viscosity slowly; slow cooling may also be used when short refluxing periods are employed. The ratio of salicylic acid treated monomer to polymer may vary from 100:1 to 1:1 depending upon the purpose of the mixture. The resultant solution, gell or rubbery mass, may be used directly for molding, sheeting, casting, coatings, etc., depending upon viscosity (ratio of monomer to polymer). It is also incorporated into either a solution of salicylic acid treated or untreated mixture to increase its viscosity or mixed with additional dry polymer for molding, casting, or sheeting purposes.

Incorporated in the above material may be one or more plasticizers which do not interfere with the desired chemical and physical properties. In addition, various dyes or pigments may or may not be used in the above mixture with or without plasticizers. In some applications, dyeing is done after the final product is obtained by dipping into a dye bath.

The final product may be subsequently hardened in boiling water or at temperatures higher or lower, inasmuch as final curing is a time-temperature-composition function.

*Example VII*

Granulated methacrylate polymer is dissolved, saturated, or softened in any low boiling solvent such as ketones, acetates, alcohols, etc. which contains from 0.0005 to 10.0 per cent salicylic acid. The resulting mixture or mass is subsequently heated or dried and reduced by cutting, grinding, etc. to the desired particle size and used for molding, coating, sheeting, castings, etc. The final product may be subsequently hardened by heating.

*Example VIII*

Granulated methacrylate polymer is dissolved or softened in any low boiling point solvent such as acetone, toluol, alcohol, etc. which is compatible with both the polymer and monomer and then added to a solution of the monomer which contains up to 2 per cent salicylic acid (with or without an oxygen catalyst, e. g. benzoyl peroxide) and heated until substantially all the low boiling solvent is evaporated and the material is then further polymerized to a powder or may be subsequently used for casting, molding, sheeting, etc.

*Example IX*

Polymeric methacrylic acid ester is dissolved, saturated, or softened in an unsaturated or saturated alcohol which contains from 0.005 to 10.0 per cent salicylic acid. The resulting mixture or mass is subsequently heated or dried and reduced by cutting, grinding, etc. to the desired particle size and used for molding, coating, sheeting, etc. The final product may be then subsequently hardened by heating.

Example X

Polymeric methacrylic acid ester is dissolved, saturated, or softened in an unsaturated or saturated alcohol which contains from 0.005 to 10.0 per cent salicylic acid. The resulting mixture is then added to a solution of the monomer which contains up to 5 per cent salicylic acid (with or without an oxygen catalyst, e. g. benzoyl peroxide) and heated until substantially all the low boiling solvent is evaporated and the material is then further polymerized to a powder or may be subsequently used for casting, molding, sheeting, etc.

Example XI

A solution of either acrylic or methacrylic monomer in an organic solvent is mixed with a compatible unsaturated or saturated alcohol which contains from 0.005 to 10.0 per cent salicylic acid and either refluxed slightly or added directly to an aqueous solution containing one or more detergents and, after polymerizing, the precipitated particles are washed and dried. The resulting material may be then subsequently used by any of the conventional methods in which regular methacrylics are used.

Example XII

To a solution of 10 per cent tetrahydrofurfuryl alcohol in monomeric methyl methacrylate, 1.5 per cent salicylic acid is added and solution is refluxed until the desired viscosity is obtained. This solution may or may not contain an organic peroxide catalyst. To the mixture may be added polymeric methyl methacrylate, a detergent material of the type described and an unsaturated or saturated alcohol. The partially polymerized solution may then be treated by any of the following:

(a) Cast into molds and polymerized either at room temperature or at elevated temperatures with or without additional peroxide catalysts.

(b) Cast into containers so as to form sheets and polymerized either at room temperature or at elevated temperatures with or without peroxide catalysts.

(c) Poured into an aqueous detergent solution or in any liquid adapted to effect precipitation of polymerized material under heat and acting so as to precipitate the polymeric material. The precipitated material may then be washed, dried, and used subsequently in molding, coatings, sheetings, castings, etc.

(d) Used for coatings directly, or (e) Mixed into monomeric or polymeric material.

Example XIII

To a solution comprising 80 per cent pure methacrylate monomer and 20 per cent glycol diacetate, 0.1 gm. benzoyl peroxide and 1.0 gm. salicylic acid are added. The material is slowly refluxed until the desired consistency is obtained and then cast into sheets, molds, etc. and cooled. Instead of casting into sheets or molds, the material may be added to an aqueous solution, with or without refluxing, which contains one or more detergents, such as sulphonated oils, alcohols, etc. and the material is polymerized into a powder or grains with heat and constant stirring. After washing and drying the material may be used for molding, coating, sheeting, castings, etc. Incorporated in the above monomeric material may be the conventional amounts of plasticizers.

Example XIV

To a solution comprising 80 per cent pure methacrylate monomer and 20 per cent paraldehyde, 0.1 gm. benzoyl peroxide and 1.0 gm. salicylic acid are added. The material is slowly refluxed until the desired consistency is obtained and then cast into sheets, molds, etc. and cooled. Instead of casting into sheets or molds, the material may be added to an aqueous solution, with or without refluxing, which contains one or more detergents, such as sulphonated oils, alcohols, etc. and the material is polymerized into a powder or grains with heat and constant stirring. After washing and drying, the material may be used for molding, coating, sheeting, castings, etc. Incorporated in the above monomeric material may be the conventional amounts of plasticizers.

Example XV

To a solution comprising 80 per cent pure methacrylate monomer, 10 per cent glycol diacetate, 10 per cent paraldehyde, 0.1 gm. benzoyl peroxide and 1.0 gm. salicylic acid are added. The material is slowly refluxed until the desired consistency is obtained and then cast into sheets, molds, etc. and cooled. Instead of casting into sheets or molds, the material may be added to an aqueous solution, with or without refluxing, which contains one or more detergents, such as sulphonated oils, alcohols, etc. and the material is polymerized into a powder or grains with heat and constant stirring. After washing and drying, the material may be used for molding, coating, sheeting, castings, etc. Incorporated in the above monomeric material may be the conventional amounts of plasticizers.

Example XVI

To a solution comprising 85 per cent pure methacrylate monomer, 5 per cent glycol diacetate, 5 per cent paraldehyde, 5 per cent tetrahydro-furfuryl alcohol, 0.1 gm. benzoyl peroxide and 1.0 gm. salicylic acid are added. The material is slowly refluxed until the desired consistency is obtained and then cast into sheets, molds, etc. and cooled. Instead of casting into sheets or molds, the material may be added to an aqueous solution, with or without refluxing, which contains one or more detergents, such as sulphonated oils, alcohols, etc. and the material is polymerized into a powder or grains with heat and constant stirring. After washing and drying, the material may be used for molding, coating, sheeting, castings, etc. Incorporated in the above monomeric material may be the conventional amounts of plasticizers.

Although the invention has been described by means of a number of specific examples, the latter are intended merely to illustrate the invention and not to limit it. Various changes in the details of the operation may be made without departing from the principles herein set forth. The temperature of heating the mixture in order to harden the resin is preferably between 80° and 100° C., but higher or lower temperatures may be used in order to obtain similar results, but at such other temperatures, the time of treatment is varied. Various catalysts may be used in the polymerization and such catalysts are well known. The polymerization may take place with the application of light or heat, or both. In place of the tetra-hydro furfural alcohol, other substances of a similar nature may be used, as for example, furane, furfural, furfuryl alcohol and the like. There may be added to the reaction mass styrene and the reaction caused to take place in the presence thereof. Also polymers and co-polymers of such addition agents may be used.

By the term "acrylate" it is intended to include the esters of an acrylic acid. The detergents or wetting agents used are always in a small amount, usually from 1 to 5%. Such detergents are the reaction products of sulphuric acid with ordinary glyceride esters of higher fatty acids, namely, the vegetable and animal oils and fats, higher hydrocarbons having more than 10 carbon atoms and higher alcohols having more than 16 carbon atoms, and also the metal and amino salts and esters of higher fatty acids having from 16 to 22 carbon atoms.

The saturated and unsaturated alcohols which are used in some of the above examples may be of various types. They are alcohols having three or more carbon atoms and preferably are alcohols higher than that alcohol, the radical of which is part of the acrylic ester. Various alcohols of the fatty series may be used, such as the primary, straight chain and branch chain alcohols. Tertiary alcohols are suitable. Such alcohols may have up to 18 carbon atoms. A number of the alcohols coming within the scope of the terminology used are allyl, crotonyl, propargyl, substituted allyl, oleyl and others of the same series and type.

I claim:

1. A method of making polymeric compositions which comprises mixing methyl methacrylate with an amount of salicylic acid ranging from .0001 to 20% based on said acrylate, refluxing said mixture and heating the same until it has polymerized to a solid state.

2. A method of making polymeric compositions which comprises mixing methyl methacrylate with an amount of salicylic acid ranging from .0001 to 20% based on said acrylate, refluxing said mixture and heating the same until it has polymerized to a solid state, and thereafter heating said polymer to a temperature above 80° C. to harden the same.

3. A method of making polymeric compositions which comprises mixing methyl methacrylate with an amount of salicylic acid ranging from .0001 to 20% based on said acrylate, refluxing said mixture and heating the same until it has polymerized to a solid state, and thereafter heating said polymer to a temperature above 80° C. and up to 120° C. to harden the same.

4. A method of making polymeric compositions which comprises mixing methyl methacrylate with an amount of salicylic acid ranging from .0001 to 20% based on said acrylate, introducing catalytic amounts of benzoyl peroxide into said mixture, refluxing said mixture and heating the same until it has polymerized to a solid state.

5. Resinous polymeric methyl methacrylate containing from .0001 to 20% salicylic acid.

6. Heat hardened resinous polymeric methyl methacrylate containing from .0001 to 20% salicylic acid.

CARL L. SHAPIRO.

REFERENCES CITED

The following references are of record in the file of this patent:

UNITED STATES PATENTS

| Number | Name | Date |
|---|---|---|
| 2,047,398 | Voss et al. | July 14, 1936 |
| 2,072,303 | Herrmann et al. | Mar. 2, 1937 |
| 2,129,665 | Barrett et al. | Sept. 13, 1938 |
| 2,346,107 | Johnson | Apr. 4, 1944 |
| 2,380,474 | Stewart | July 31, 1945 |

FOREIGN PATENTS

| Number | Country | Date |
|---|---|---|
| 116,889 | Australia | May 6, 1943 |

OTHER REFERENCES

Du Pont Lucite Manual, published by E. I. Du Pont de Nemours and Co., November 1942, page 117.